(12) United States Patent
Azibert

(10) Patent No.: US 7,097,176 B2
(45) Date of Patent: Aug. 29, 2006

(54) BALANCED MECHANICAL SEAL ASSEMBLY

(75) Inventor: Henri V. Azibert, Windham, NH (US)

(73) Assignee: A. W. Chesterton Co., Stoneham, MA (US)

( * ) Notice: Subject to any disclaimer, the term of this patent is extended or adjusted under 35 U.S.C. 154(b) by 0 days.

(21) Appl. No.: 10/791,515

(22) Filed: Mar. 1, 2004

(65) Prior Publication Data

US 2004/0227298 A1 Nov. 18, 2004

Related U.S. Application Data

(60) Provisional application No. 60/450,795, filed on Feb. 28, 2003.

(51) Int. Cl.
*F16J 15/34* (2006.01)

(52) U.S. Cl. ...................... 277/399; 277/408
(58) Field of Classification Search ......... 277/399–401
See application file for complete search history.

(56) References Cited

U.S. PATENT DOCUMENTS

| | | | |
|---|---|---|---|
| 5,203,575 A | 4/1993 | Azibert et al. | |
| 5,213,340 A | 5/1993 | Azibert et al. | |
| 5,333,882 A | 8/1994 | Azibert et al. | |
| 5,494,299 A * | 2/1996 | Rockwood | 277/364 |
| 5,571,268 A | 11/1996 | Azibert | |
| 5,711,532 A | 1/1998 | Clark et al. | |
| 5,725,220 A | 3/1998 | Clark et al. | |
| 5,913,520 A | 6/1999 | Clark et al. | |
| 6,059,293 A | 5/2000 | Azibert et al. | |
| 6,068,263 A | 5/2000 | Azibert et al. | |
| 6,068,264 A | 5/2000 | Azibert et al. | |
| 6,131,912 A | 10/2000 | Azibert et al. | |
| 6,224,061 B1 * | 5/2001 | Roddis | 277/370 |

* cited by examiner

*Primary Examiner*—Vishal Patel
(74) *Attorney, Agent, or Firm*—Lahive & Cockfield, LLP; Anthony A. Laurentano, Esq.

(57) ABSTRACT

A mechanical seal having a single rotatable seal ring having a pair of concentric seal faces to form a radially inner seal face and a radially outer seal face. The mechanical seal also includes first and second stationary seal rings, each having a seal face, where the seal face of the first stationary seal ring contacts the radially outer seal face of the rotatable seal ring and the seal face of the second stationary seal ring contacts the radially inner seal face of the rotatable seal ring. The seal also includes a sleeve adapted to be mounted about the rotating shaft and rotatably coupled thereto and to the rotatable seal ring, said sleeve having a flange portion that is configured for housing at least a portion of the rotatable seal ring, and a gland for housing at least partially the single rotary seal ring and the first and second stationary seal rings. Under positive and negative pressure conditions, the combined area of the seal piston areas are substantially identical to provide a balanced seal arrangement without requiring the use of axially movable components.

18 Claims, 3 Drawing Sheets

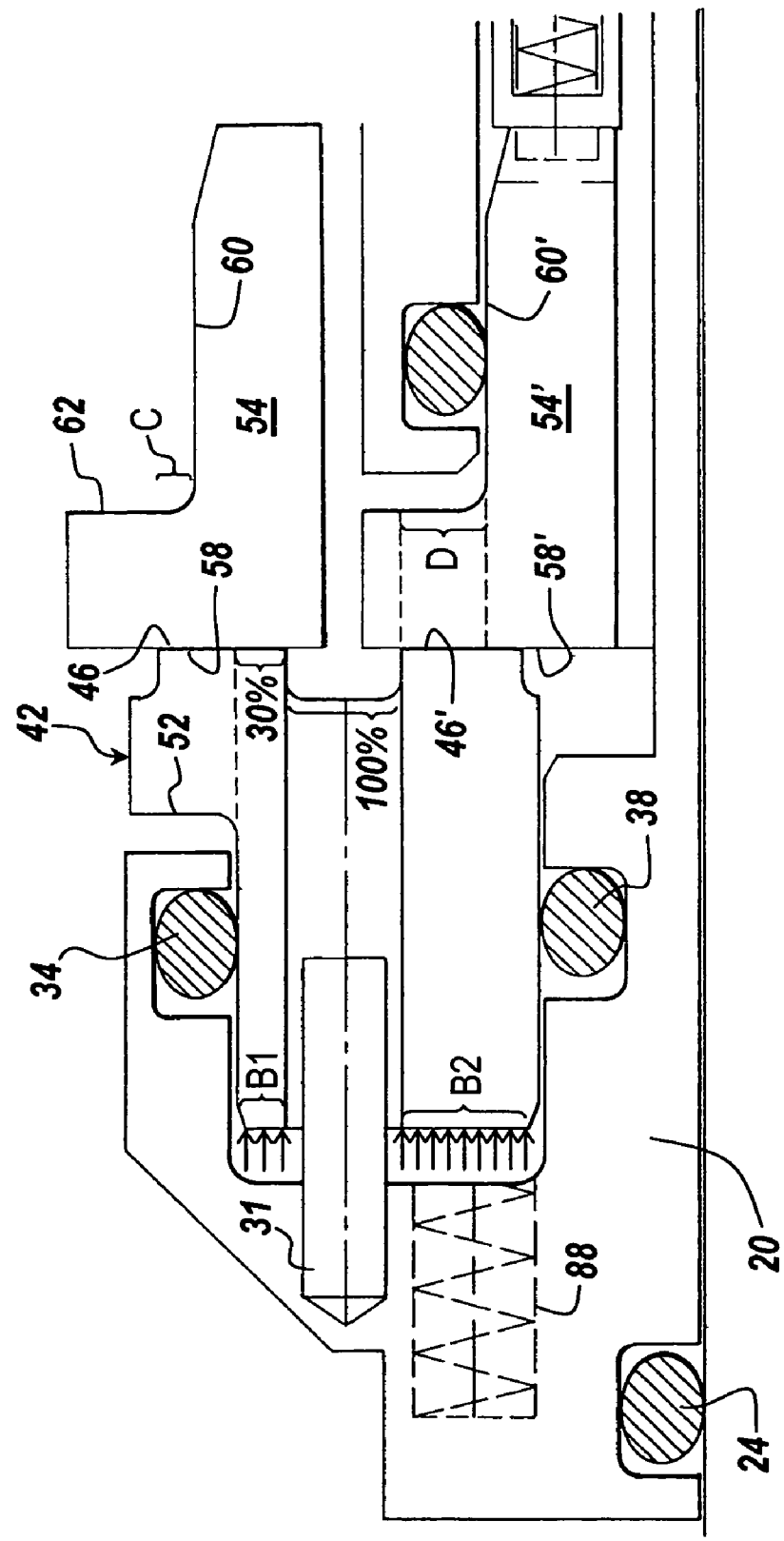

BALANCED MECHANICAL SEAL ASSEMBLY

RELATED APPLICATIONS

The present application claims priority to U.S. Provisional Patent Application Ser. No. 60/450,795, entitled "Balanced Mechanical Seal Assembly", filed Feb. 28, 2003, the contents of which are herein incorporated by reference. This application is also related to Ser. No. 10/791,514 entitled "Balanced Mechanical Seal Assembly," filed on even date herewith, the contents of which are herein incorporated by reference.

FIELD OF THE INVENTION

The present invention relates to a balanced mechanical seal and more particularly to a double balanced mechanical seal for providing a seal between a rotating shaft and a stationary housing.

BACKGROUND OF THE INVENTION

Conventional mechanical seals are employed in a wide variety of mechanical apparatuses to provide a pressure-tight and a fluid-tight seal between a rotating shaft and a stationary housing. The seal is usually positioned about the rotating shaft, which is mounted in and protrudes from the stationary housing. The seal is typically bolted to the housing at the shaft exit, thus preventing loss of pressurized process fluid from the housing. Conventional mechanical seals include face type mechanical seals, which include a pair of annular sealing rings that are concentrically disposed about the shaft, and axially spaced from each other. The sealing rings each have seal faces that are biased into physical contact with each other. Usually, one seal ring remains stationary, while the other ring contacts the shaft and rotates therewith. The relatively rotating, contacting seal faces isolate and seal a pressurized liquid, i.e., the process fluid, along the rotating shaft. The mechanical seal prevents leakage of the pressurized process fluid to the external environment by biasing the seal ring sealing faces into physical contact with each other.

To cool the seals and to aid in preventing any passage of process fluid across the seal faces, a second pressurized liquid, i.e., a barrier fluid, is often introduced to the seals on the side of the seal faces opposite that in contact with the process fluid. Springs normally bias the seal faces together. In balanced seal arrangements, the pressurized fluids are also applied to piston areas defined on the sides of the seal members opposite the seal faces to aid in closing the seal faces. This relationship minimizes heat generation from the frictional contact of the seal faces while maintaining a closing force on the seal faces sufficiently high to ensure proper sealing. It is also desirable to minimize the contact area of the seal faces so as to minimize heat generation as the seal faces rotate relative to each other. Additionally, when a barrier fluid is employed, a double seal arrangement is utilized in which the process fluid is confined to one end of the seal and the barrier fluid to the center of the seal with relatively rotating seal faces on either side of the barrier fluid.

In one type of double balanced seal in the prior art, both fluids have access to the rear of the seal members opposite the seal faces, and the desired balance ratio of the piston area to the seal face contact area is achieved by providing O-rings slidable in their O-ring grooves behind the respective seal faces of the seal members. Thus, the O-rings slide in the grooves to permit application of fluid pressure from the fluid having the highest pressure to the appropriate piston areas on the sides of the seal members opposite the seal faces. Springs may be located within the seal on either side of the seal faces and may be exposed to either or both of the process and barrier fluids.

Prior double-balanced mechanical seal assemblies have significant drawbacks. First, the piston areas in prior double-balanced mechanical seal assemblies are dependent upon the size and configuration of the O-rings. As the inner and outer diameters of the O-rings define the balance pressure points for the respective fluids, the radial contact dimension of the seal faces must be sufficiently large to account for the thickness of the O-rings. This limits the design of the seal faces for which minimum contact area is desired to reduce heat generation.

An additional drawback of double-balanced mechanical seal assemblies of the prior art is that the double-balanced seal does not operate efficiently under reverse pressure conditions. Under reverse pressure conditions, the O-rings slide in their grooves to achieve sealing. Furthermore, the process fluid, which may be dirty and include contaminants, causes dirt and other particles to get caught in the sliding O-ring interface, which causes wear and O-ring hang-up over time, thereby negatively impacting seal performance.

SUMMARY OF THE INVENTION

The present invention provides for a mechanical seal having a single rotatable seal ring having a pair of concentric seal faces to form a radially inner seal face and a radially outer seal face. The rotatable seal ring includes an axially extending passage formed therein for allowing passage of a barrier fluid therethrough. The mechanical seal also includes first and second stationary seal rings, each having a seal face, where the seal face of the first stationary seal ring contacts the radially outer seal face of the rotatable seal ring and the seal face of the second stationary seal ring contacts the radially inner seal face of the rotatable seal ring.

The seal also includes a sleeve adapted to be mounted about the rotating shaft and rotatably coupled thereto and to the rotatable seal ring, said sleeve having a flange portion that is configured for housing at least a portion of the rotatable seal ring, and a gland for housing at least partially the single rotary seal ring and the first and second stationary seal rings.

Under normal operating conditions, when the process fluid pressure is greater than the barrier fluid pressure, the process fluid exerts a force on first piston areas to bias the seal faces together. Under reverse operating conditions, when the barrier fluid pressure is greater than the process fluid pressure, the barrier fluid exerts a force on second piston areas to bias the seal faces together. The combined area of the first piston areas is substantially identical to the combined area of the second piston areas to provide a balanced seal arrangement for standard and reverse pressure conditions without requiring the use of axially movable components.

Advantageously, a seal according to the present invention achieves pressure balance by virtue of the geometry of the parts, providing fixed, predetermined piston areas on the sides of the rotary and stationary seal members opposite the seal faces without reliance on any movable parts which may be subject to malfunction. An individual piston area is exposed to only one of the fluids. Further, the contact area of the seal faces may be optimized without any limitation imposed by the size of the O-rings defining the balance pressure points. Because it is possible to design seal faces having a small contact area, heat generation in operation of the seal is minimized. Furthermore, the movable interfaces of the mechanical seal do not contact the dirty process fluid and are therefore not subject to additional wear.

Other features and advantages of the invention will be apparent from the following description of the preferred embodiment thereof and from the claims.

DESCRIPTION OF THE DRAWINGS

FIG. 3 is an enlarged fragmentary view of a portion of the cross-sectional view of FIG. 1 during negative or reverse pressure conditions.

DETAILED DESCRIPTION

Figure 1:
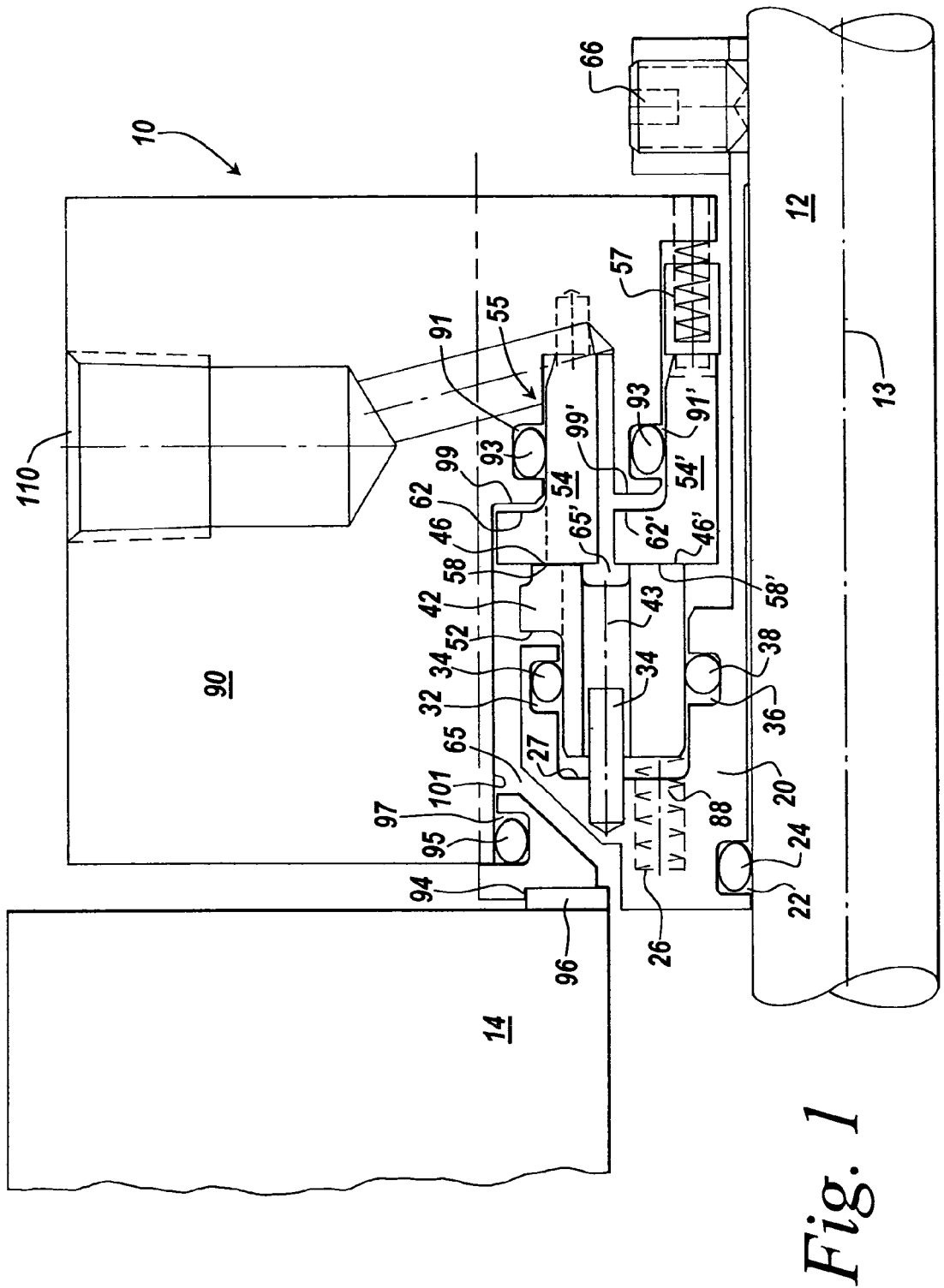
FIG. 1 is a cross-sectional view of a mechanical seal according to an illustrative embodiment of the invention.

The present invention provides a mechanical seal for mounting to a stationary housing that contains a rotating shaft. The invention will be described below relative to illustrative embodiments. Those skilled in the art will appreciate that the present invention may be implemented in a number of different applications and embodiments and is not specifically limited in its application to the particular embodiment depicted herein.

The terms "process medium" and "process fluid" used herein generally refer to the medium or fluid being transferred through the housing. In pump applications, for example, the process medium is the fluid being pumped through the pump housing.

The terms "axial" and "axially" used herein refer to a direction generally parallel to the shaft axis. The terms "radial" and "radially" refer to a direction generally perpendicular to the shaft axis.

The term "shuttle member" as used herein is intended to include any structure suitable for movement, either axially, radially, or both, between multiple positions within the mechanical seal to enable, assist or facilitate the application of proper closing pressure forces to one or more seal rings when exposed to various pressure conditions (positive and/or negative pressure conditions) to help retain sealing engagement of the seal faces. The shuttle element can be configured to house one or more sealing elements, or none if desired, for sealing one or more seal fluids. According to a preferred embodiment, the shuttle element as used and defined herein is not intended to cover a member or device that includes only an O-ring. Although various embodiments are disclosed herein, the shuttle member can be configured in many different ways. For example, one of ordinary skill, in light of the teachings of the present invention, is capable of configuring or providing a proper shuttle member configuration when considering one or more of the pressure conditions within the seal, the type of seal, the type, number and configuration and location of the seal rings, the type of application, and various other considerations. Those of ordinary skill will also recognize that the shuttle element can be positioned at different locations, and need not necessarily be positioned adjacent the rotary seal ring. For example, the shuttle element can be positioned adjacent the stationary seal ring. The shuttle member can also comprise one or more parts or components, and hence can form an assembly or be provided as part of an assembly. Not all parts of the assembly need be movable.

The term "mechanical seal" as used herein is intended to include various types of mechanical seals, including single seals, split seals, tandem seals, dual seals, concentric seals, gas seals, spiral seals, and other known seal types and configurations.

The term "gland" as used herein is intended to include any suitable structure that enables, facilitates or assists securing the mechanical seal to a housing, while concomitantly surrounding or housing, at least partially, one or more seal components. If desired, the gland can also provide fluid access to the mechanical seal.

Referring now to the drawings and more particularly to FIG. 1, a mechanical seal 10 according to an illustrative embodiment of the invention is mounted on a pump shaft 12 and is secured to the pump housing 14. The seal elements are configured to provide a balanced seal assembly throughout varied pressure conditions and even under reverse or negative pressure conditions. The shaft 12 extends along a first axis 13. The mechanical seal 10 is constructed to provide fluid sealing between the housing 14 and the shaft 12, thereby preventing a pressurized process fluid from escaping the housing 14. The seal 10 includes a rotatable seal ring 42 and a pair of stationary seal rings 54 and 54'. Those of ordinary skill in the art will readily recognize that other configurations can also be used. For example, a single stationary seal ring can be used with a pair of rotary seal rings. Fluid sealing is primarily achieved between a primary rotary seal face 46 on the rotatable seal ring 42 and a primary stationary seal face 58 on the primary stationary seal ring 54. The seal faces 46 and 58 of the primary sealing members are biased into sealing relationship with each other, as described in greater detail below. A secondary seal is achieved between a secondary rotary seal face 46' on the rotatable seal ring 42 and a secondary stationary seal face 58' on the secondary stationary seal ring 54' to provide additional sealing. Examples of conventional tandem, dual or concentric type seals are described in U.S. Pat. Nos. 5,213,340, 6,131,912, 6,068,263, 6,068,264, and 6,059,293, the contents of which are incorporated herein by reference. The individual seal surfaces form a fluid tight seal operable under a wide range of operating conditions and in a wide range of services, as described in greater detail below.

According to one practice, one or more of the seal rings 42, 54 and 54' can optionally be split into a plurality of seal ring segments having segment sealing faces biased into sealing relationship with each other according to known techniques.

The illustrated mechanical seal 10 includes a sleeve 20 rotatably coupled to the shaft 12, and holds the rotary elements of the mechanical seal 10. At the axially inboard end of the sleeve 20, i.e., the end closest to the stuffing box 18, a first groove 22 on the inner surface of the sleeve 20 receives a first sealing element, such as O-ring 24, which is positioned adjacent the shaft 12 to prevent process fluid from passing from the pump between the sleeve 20 and the shaft 12. The sleeve 20 includes a flange 26 at an inboard end thereof. The flange 26 is recessed for positioning or seating the rotary seal ring 42. The flange 26 further includes a second groove 32 that mounts a second sealing element, such as O-ring 34, for sealing against the top of the rotary seal ring 42. A third groove 36 in the sleeve receives a third sealing element, such as O-ring 38, for sealing against the bottom of the rotary seal ring 42. The flange also accommodates a drive pin 31 that rotatably couples the sleeve 20 to the seal ring 42. The flange can be integrally formed with the sleeve or can be provided as a separate component.

Figure 2:
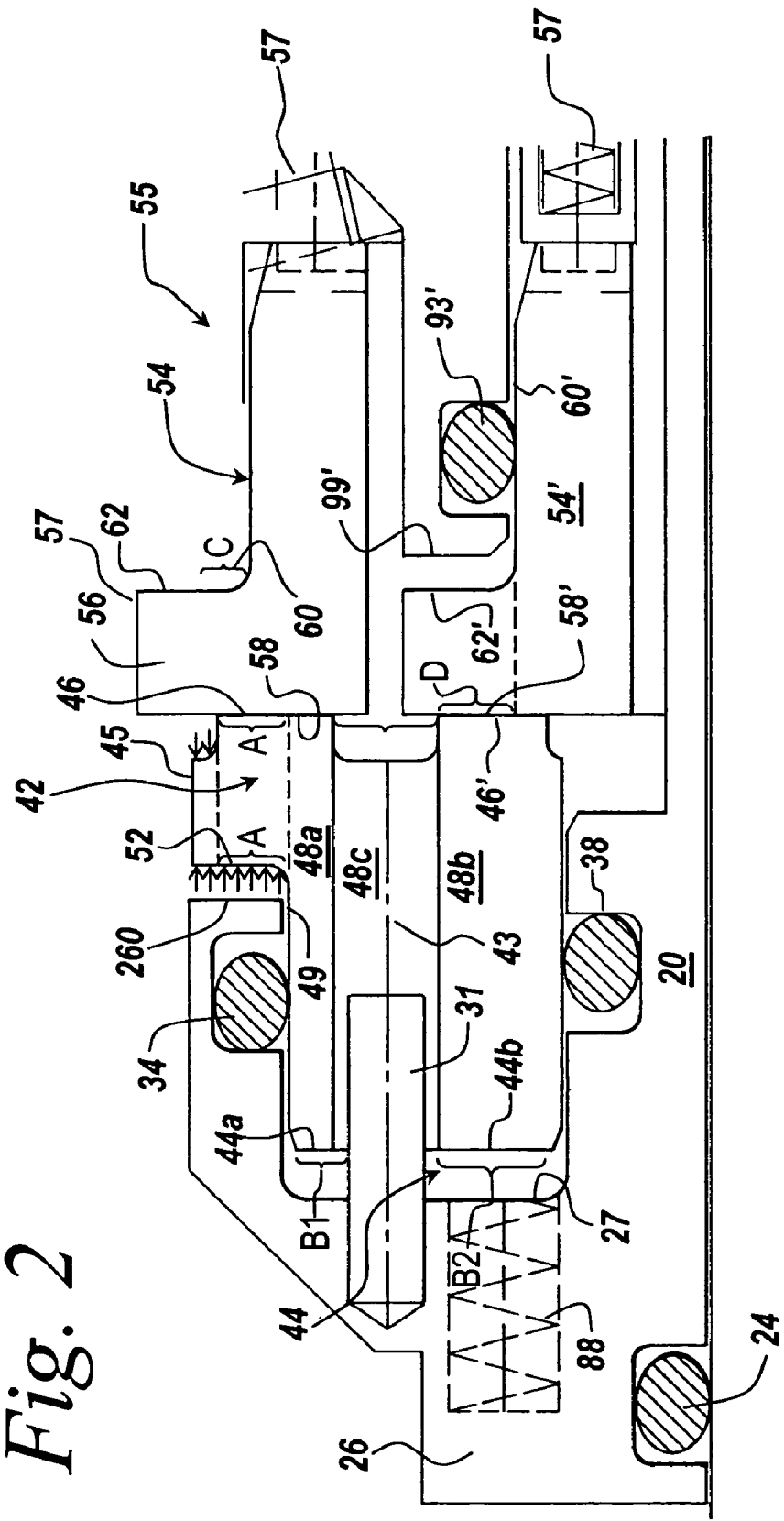
FIG. 2 is an enlarged fragmentary view of a portion of the cross-sectional view of FIG. 1 during positive or standard pressure conditions.

The rotary seal ring 42 is mounted on the sleeve 20 axially outwardly from the flange 26 and is at least partially positioned within the recess of the flange 26. The rotary seal member 42 includes a narrow axially outwardly facing primary seal face 46 and a narrow axially outwardly facing secondary seal face 46' that is spaced radially inwards from the primary seal face 46. As shown in FIG. 2, the rotary seal ring 42 includes a radially extending outward portion 48a and a radially extending inward portion 48b separated from the radially outward portion by an axially extending passage 43 formed in the rotary seal ring. The passage 43 allows barrier fluid to pass through and fill a space between the flange 26 and an axially inwardly facing wall 44 of the rotary seal ring 42. The radially outward portion 48a and the radially inward portion 48b are connected by an intermediate connecting portion 48c. A narrow axially outwardly facing seal face 46 extends from the radially outward seal portion 48a and engages the primary stationary seal face 58 of the stationary member 54. The seal ring has an outer surface 45. The seal ring 42 also includes an axially extending surface or step 49 positioned axially and radially inwardly from the surface 45. The step 49 has an outer diameter smaller than the outer diameter of the radially outward seal portion 48a. Together, the surface 45 and the step 49 define a first axially inwardly facing non-seal face wall 52 formed on a side of the radially outward sealing portion 48a opposite the primary rotary seal face 46. The step 49 terminates in a second axially inwardly facing wall 44 that is spaced radially and axially inwardly from the non-seal face wall 52. The second axially inwardly facing wall 44 is divided into an outer wall 44a and an inner wall 44b by the two radially separated seal ring faces. As shown, the rotary seal ring 42 may further include a first spring 88 for providing an initial biasing force on the seal faces 46 and 46'. The rotary seal ring 42 may also include a plurality of notches which engage bosses on the sleeve 20 for locking the rotary seal member 42 to the sleeve 20 for rotation therewith.

Referring to FIGS. 1 and 2, the axially inwardly facing wall 52, opposite the primary seal face 46, is spaced from a front wall 260 of the flange to allow process fluid access therebetween, thus forming piston area A. Specifically, the piston area A is defined by or measured between the outermost edge of the seal face 46 and the step 49. The force arrows illustratively represent the closing force generated by at least the process fluid on the piston area A and the seal ring 42. The second axially inwardly facing wall 44, comprising wall portions 44a and 44b, is spaced from the axial wall 27 of the recess in the flange 26 to allow barrier fluid access therebetween, thus forming piston areas B1 and B2, as shown. The piston area B1 is defined by or measured between the innermost edge of the seal face 46 and the step 49. The piston area B2 is defined by or measured between or across the radial extent of the seal face 46'.

The stationary seal ring 54 is provided axially outwardly of the rotary seal ring 42, adjacent the rotary seal face 46. The stationary seal ring 54 has a relatively wide seal portion 56 having an axially inwardly facing seal face 58, a portion of which contacts the primary rotary seal face 46. The wide seal portion 56 extends from an inner diameter somewhat greater than the outer diameter of the sleeve 20 to an outer diameter slightly smaller than the inner diameter of the gland 90 (described in detail below). Outwardly of the seal portion 56 of the stationary seal member 54, a secondary sealing portion 55 is defined by a step 60 having an outer diameter smaller than the outer diameter of sealing portion 56. The outer surface 57 of the seal ring 54 and the step 60 define an axially outward non-seal face wall 62 on a rear side of the sealing portion 56 opposite seal face 58.

In a particular embodiment, the stationary seal ring 54 is made of silicon carbide and the rotary seal member 42 is made of carbon. One skilled in the art will recognize that the seal members may be formed of any suitable material and are not limited to carbon and/or silicon carbide.

A secondary stationary seal ring 54' is spaced radially inwardly from the primary stationary seal ring 54 and defines the secondary stationary seal face 58' for engaging the secondary rotary seal face 46' of the rotary seal ring 42. The second stationary seal member 54' is substantially identical to the first stationary seal member 54. The portions of the second stationary seal member 54' are designated with the same reference numerals with a superscript prime, as the corresponding portions of the first stationary seal member 54. The second stationary seal ring 54' is spring-loaded by a second spring 59 to bias the secondary seal faces 46' and 58' together. The spring-loading of the seal rings further allows the seal faces to track each other.

The mechanical seal 10 preferably includes a gland 90 for providing the barrier fluid to the seal assembly. The barrier fluid transfers heat away from the seal faces to reduce the effects of thermal stress on the seal faces and further aids in preventing the passage of process fluid across the seal faces. The gland 90 is centered on the stationary housing 14 and secured thereto. As shown, the gland 90 defines a chamber 65 between the flange 26 and the radially inner surface 101 of the gland 90 to allow the process fluid to access the first piston area A. The gland 90 further defines a second chamber 65' formed by the space between the stationary seal rings 54, 54', the passage 43 through the rotary seal ring 42 and the space between the flange 26 and the axially inwardly facing wall 44 of the rotary seal ring, for the barrier fluid.

The gland 90 can include conventional grooves to house sealing components in order to prevent process fluid from leaking. In particular, the illustrated gland 90 includes a groove 94 disposed at an inboard end, i.e. the end towards the housing 14, thereof that is sized and configured for seating a relatively flat gasket 96 that is placed in facing engagement with the housing 14. The illustrated gland 90 further includes an O-ring 95 seated in a groove 97. The illustrated gasket 96 and O-ring prevent process fluid from leaking between the housing 14 and the mechanical seal 10.

The gland 90 is provided with a pair of radially spaced grooves 91 and 91' for receiving sealing elements, such as O-rings 93 and 93', respectively. The O-rings overly and seal against the stepped walls 60 and 60' of the stationary seal members 54 and 54', respectively. The first axially inwardly facing end 99 of the gland is spaced from the axially outward non-seal face wall 62 of the primary stationary seal member 54 to permit access by the process fluid thus forming piston area C. The piston area C is defined by or measured between the step 60 of the seal ring 54 and the radially outermost edge of the seal face 46. Similarly, the second axially inwardly facing end 99' of the gland is spaced from the non-seal face wall 62' of the secondary stationary seal member 54' to permit access by the barrier fluid, thus forming piston area D. The piston area D is defined by or measured between the step 60' of the seal ring 54' and the radially outermost edge of the inner seal face 46'.

According to alternate embodiments, the gland 90 includes a pair of generally identical gland segments, or comprises an assembly of several gland segments.

The gland 90 further includes a flush port 110 formed between inner and outer surfaces of the gland. The flush port 110 preferably allows communication between the chamber 65' and an external environment, or any selected fluid source coupled thereto. The flush port 110 can have any selected configuration, and is preferably threaded in order to facilitate connection to any suitable fluid conduit. The flush port 110 may be utilized to introduce barrier fluid to the chamber 65'.

As shown, the gland 90 forms a first groove 91 with the primary stationary seal ring 54 and a second groove 91' with the secondary stationary seal ring 54'. The grooves 91, 91' receive O-rings 93, 93', respectively, which provide sealing between the gland 90 and the stationary seal rings 54, 54'.

A lock ring 66 is mounted on the sleeve 20 at the outer end thereof and mechanically couples the sleeve 20 to the shaft 12. The lock ring 66 may include a radially enlarged outer end having threaded apertures aligned with apertures for receiving fasteners locking the seal assembly to the shaft 12 for rotation therewith. The enlarged end of the lock ring 66 also has threaded apertures aligned with apertures in the sleeve 20 for receiving threaded fasteners having cylindrical ends adapted to axially locate the seal components prior to assembly in a pump.

In operation, the sleeve 20 rotates with the shaft 12 and carries with it the rotary seal member 42, as well as the lock ring 66 and other rotatable elements of the mechanical seal 10. The stationary seal members 54, 54' are held in a stationary position by a lug engaging the gland 90. Process fluid moves through the chamber 65 between the outer diameter of seal members 42, 54 and the inner diameter of the gland 90. Springs 57 and 88 bias both the primary seal faces 46, 58 and the secondary seal faces 46', 58' together. The relatively rotatable primary seal faces 46, 58 seal the process fluid at the stationary/rotary interface and the O-ring 91 seals process fluid from passing beyond the stationary seal member 54. Barrier fluid circulates through the chamber 65, through the passage 43 and past the rotatable seal ring 42. The relatively rotatable secondary seal faces 46', 58' seal the barrier fluid within the mechanical seal 10.

During operation, forces acting on the seal faces are balanced to provide zero net thrust force throughout different pressure conditions. According to an alternate embodiment, the seal components, such as the seal rings 42, 54, and 54', can be configured to result in net closing force on the seal faces to prevent fluid leakage at the seal faces during all normal or expected pressure conditions, including both positive and negative pressure conditions. The mechanical seal 10 of the present invention achieves pressure balance by virtue of the geometry of the parts and provides equal and opposite piston forces acting on the seal faces and at the piston areas to bias the seal faces into sealing relationship with each other.

Referring to FIGS. 2 and 3, the rotary seal member 42 is adapted to permit the barrier fluid to exert pressure on walls 44a and 44b, opposite seal faces 46 and 46', and the process fluid to exert pressure on wall 52, opposite the seal face 46. The primary stationary seal ring 54 is adapted to permit the barrier fluid to exert pressure on wall 62', opposite the primary stationary seal face 58'. The secondary stationary seal ring 54' is adapted to permit the barrier fluid to exert pressure on wall 62 opposite the secondary stationary seal face 58'. The walls thereby define predetermined, fixed piston areas, namely piston area A, piston areas B1 and B2, piston area C and piston area D, which transmit pressure from one of the fluids toward the primary and secondary sealing faces.

In order to achieve a balanced mechanical seal, the present invention provides for specially configured rotary and stationary seal rings having specific piston areas. Specifically, the rotary seal ring and piston areas of the invention are configured to comprise the desired percentage of the contact area of the seal faces. Each piston area is defined by the extent to which the associated wall or walls overlap the contact area of the associated seal faces. Thus, in the case of rotary seal member 42, piston area A of wall 52 extends between the outer diameter or outermost edge of the seal face 46 and the step 49. Piston area B1 extends between the inner diameter of the seal face 46 and the step 49. Piston area B2 extends between the inner diameter or innermost radial edge of the seal face 46' of the seal ring 42 and the inner diameter of the passage 43 through the rotary seal ring 42. According to one practice, this may coincide with the radial outermost edge of the seal face 46'.

Piston area C is formed on wall 62 of the stationary seal ring and extends between the outer diameter or outermost edge of the seal face 46 and the step 60. Piston area D is formed on wall 62' and extends between the outer diameter of the step 60' and the outer diameter or outermost edge of the seal face 46'. These piston areas comprise between about 50% and about 100%, or preferably between about 60% and about 80%, or most preferably about 70% of the contact areas of the seal faces 46, 58 and 46', 58'. In one preferred embodiment, piston area A comprises about 70% of the contact area of the primary seal faces 46, 58. Piston are B1 comprises about 30% of the contact area of the primary seal faces 46, 58. Piston area B2 comprises about 110% of the contact area of the secondary seal faces 46',58'. Piston area C comprises about 70% of the contact area of the primary seal faces 46, 58. Piston area D comprises about 70% of the contact area of the secondary seal faces 46, 58. Hence, the axial inner most pressure force loading applied to the wall 44 at portions 44a and 44b is about 110%. Since the rotary seal ring 42 is a single component, this force is averaged, and hence about 70% is applied across each face.

Barrier fluid entering through the port 110 of the gland 90 is sealed in the chamber 65' by the O-rings 34, 38, 93 and 93'. The barrier fluid passes through the chamber 65' and exerts pressure on walls 44a, 44b on the opposite sides of the rotary seal member 42 from the seal faces 46, 58 and 46', 58', at piston areas B1 and B2. The process fluid passes through the chamber 65 and is sealed by O-rings 34 and 93. The process fluid exerts a pressure on piston area A. The barrier fluid also exerts a pressure on piston area D, opposite seal face 58'.

Under normal or positive operating pressure conditions, as shown in FIG. 2, the process fluid has a pressure that is higher than the pressure of the barrier fluid. The process fluid exerts a pressure or force on piston area A, which transmits a closing force to the seal faces 46, 48. The barrier fluid exerts a pressure or force on a substantially equal and opposite area of the secondary seal faces 46', 58' via piston area D, which overlaps with about 70% of the seal face contact area of the secondary seal faces. Thus, the forces acting on the seal faces under normal operating conditions are balanced.

Under reverse or negative operating pressure conditions, as shown in FIG. 3, the barrier fluid has a pressure that is higher than the pressure of the process fluid. The barrier fluid exerts a pressure on piston areas B1 and B2 formed on the primary rotary seal ring. As shown, piston area B1 is about 30% of the seal face area and piston area B2 is about 110% of the seal face area. Combined, the two piston areas B1 and B2 provide a closing force acting over 140% of a seal face, preferably averaging about 70% per seal face. The seal fluid or fluids also exert a substantially equal and opposite pressure or force on the piston areas C and D, each corresponding to an area of about 70% of the seal faces, formed on the stationary seal rings. The combined area of the piston areas C and D thus balance the areas of piston areas B1 and B2 to provide a balanced seal assembly under reverse operating conditions. Hence, with a single static rotary and stationary seal ring design free of any substantially axially movable components, such as a shuttle member, the mechanical seal of the present invention achieves a balanced design.

Advantageously, the contact area of the seal faces are not limited by O-ring size and can be designed to be as small as feasible to minimize heat generation. The piston areas A, B1 and B2 of the rotary seal member 42 and the piston areas C and D on the stationary seal members where pressure from the process fluid and the barrier fluid are applied, can each be somewhat smaller than piston area B of stationary seal member 54, where pressure from the process fluid is applied. The seal constantly produces a net closing force on the seal faces to bias the seal faces together, with no net thrust on the seal, whether operating under standard or reverse operating condition.

Other embodiments of this invention will occur to those skilled in the art are within the scope of the following claims. For example, it would be possible to employ a single stationary seal having two seal faces in conjunction with a split gland.

The invention claimed is:

1. A mechanical seal for mounting to a housing containing a rotating shaft, said mechanical seal comprising:
   a single rotatable seal ring having a pair of concentric seal faces to form a radially inner seal face and a radially outer seal face, said rotatable seal ring having an axially extending passage formed therein for allowing passage of a barrier fluid therethrough,
   first and second stationary seal rings, each having a seal face, wherein the seal face of the first stationary seal ring contacts the radially outer seal face of the rotatable seal ring and the seal face of the second stationary seal ring contacts the radially inner seal face of the rotatable seal ring,
   a sleeve adapted to be mounted about the rotating shaft and rotatably coupled thereto and to the rotatable seal ring, said sleeve having a flange portion that is configured for housing at least a portion of the rotatable seal ring, and
   a gland for housing at least partially the single rotary seal ring and the first and second stationary seal rings,
   wherein the rotatable seal ring and the first and second stationary seal rings are configured and arranged to provide for first and second piston areas on a face wall of the rotatable seal ring adjacent an inner surface of the flange that allow the barrier fluid to exert pressure across a selected portion that is between about 50% and about 140% of the contact area of the seal face contact areas.

2. The mechanical seal of claim 1, wherein the selected area is about 140% of the contact area of the seal face contact areas.

3. The mechanical seal of claim 1, wherein the rotatable seal ring and the first and second stationary seal rings are configured and arranged to provide for a third piston area on a non-seal face wall opposite of the rotatable seal ring opposite the radially outer seal face, a fourth piston axes on a non-seal face wall opposite the seal face of the first stationary seal ring, and a fifth piston area on a non-seal face wall opposite the seal face of the second stationary seal ring.

4. The mechanical seal of claim 3, wherein the pressure forces exerted on the first and second piston areas are generally offset by the pressure forces exerted on the fourth and fifth piston areas.

5. The mechanical seal of claim 1, wherein the seal is operable in both positive and negative pressure conditions.

6. The mechanical seal of claim 1, wherein the seal is operable independent of O-ring size.

7. The mechanical seal of claim 1, wherein the seal is free of a shuttle element.

8. A mechanical seal for mounting to a housing containing a rotating shaft, said mechanical seal comprising:
   a single rotatable seal ring having a pair of concentric seal faces to form a radially inner seal face and a radially outer seal face, said rotatable seal ring having an axially extending passage formed therein for allowing passage of a barrier fluid therethrough,
   first and second stationary seal rings, each having a seal face, wherein the seal face of the first stationary seal ring contacts the radially outer seal face of the rotatable seal ring and the seal face of the second stationary seal ring contacts the radially inner seal face of the rotatable seal ring,
   a sleeve adapted to be mounted about the rotating shaft and rotatably coupled thereto and to the rotatable seal ring, said sleeve having a body portion mounted about the rotating shaft, a flange portion extending from the body portion and defining a recess between the body portion and the flange portion for receiving at least a portion of the rotatable seal ring, a first groove disposed on a radially outer surface of the body portion receiving a first o-ring for contacting a radially inner surface of the rotatable seal ring and a second groove disposed in a radially inner surface of the flange portion receiving a second o-ring for contacting a radially outer surface of the rotatable seal ring, and
   a gland for housing at least partially the single rotary seal ring and the first and second stationary seal rings.

9. The mechanical seal of claim 8, wherein the flange portion is separated from a radially extending surface of the rotatable seal ring opposite the radially outer seal face to define a first piston area far allowing process fluid to exert pressure on the radially outer seal face.

10. The mechanical seal of claim 9, wherein the first piston area has an area that is about 70% an area of the radially outer seal face.

11. The mechanical seal of claim 8, wherein the rotatable seal ring includes a radially outward portion defining the radially outer seal face, the radially outward portion comprising a first axially extending outer surface; and an axially extending stepped surface positioned axially and radially inward of the outer surface to define a first axially inwardly facing non-seal face wall formed on a side of the radially outward sealing portion opposite the radially outer seal face.

12. The mechanical seal of claim 11, wherein the second o-ring contacts the axially extending stepped surface.

13. The mechanical seal of claim 11, wherein the axially extending stepped surface terminates in a second axially inwardly facing wall that is spaced radially and axially inwardly from the first axially inwardly facing non-seal face wall.

14. The mechanical seal of claim 11, wherein the rotatable seal ring further comprises a radially inward portion separated from the radially outward portion by the axially extending passage and an intermediate connecting portion for connecting the radially outward portion and the radially inward portion.

15. A mechanical seal for mounting to a housing containing a rotating shaft, said mechanical seal comprising,
- a first seal ring having a pair of concentric seal faces to form a radially inner seal face and a radially outer seal face, said first seal ring having an axially extending passage formed therein for allowing passage of a barrier fluid therethrough for pressure balance control,
- second seal ring having a seal face in contact with the radially outer seal face of the first seal ring,
- third seal ring having a seal face in contact with the radially inner seal face of the first seal ring,
- a sleeve adapted to be mounted about the rotating shaft and rotatably coupled thereto and to at least one of the seal rings, said sleeve having a flange portion that is configured for housing at least a portion of the seal ring, and
- a gland for housing at least partially the seal rings.

16. The mechanical seal of claim 15, wherein the first seal ring is a rotary seal ring.

17. The mechanical seal of claim 15, wherein the second and third seal rings are stationary seal rings.

18. The mechanical seal of claim 15, wherein the barrier fluid fills a space between the flange portion of the sleeve and an axially inwardly facing wall of the first seal ring to provide said pressure balance control.

* * * * *